United States Patent [19]

Bezerra et al.

[11] Patent Number: 5,242,182
[45] Date of Patent: Sep. 7, 1993

[54] BICYCLE AND THE LIKE

[76] Inventors: Wilson X. Bezerra; Silvana A. Bezerra, both of 9 Elena Pl., Belleville, N.J. 07109

[21] Appl. No.: 804,768

[22] Filed: Dec. 9, 1991

[51] Int. Cl.⁵ .............................................. B62M 1/04
[52] U.S. Cl. ...................................... 280/253; 280/257
[58] Field of Search ............... 280/253, 255, 256, 257, 280/258

[56] References Cited

U.S. PATENT DOCUMENTS

4,456,276  6/1984  Bortolin .............................. 280/257

FOREIGN PATENT DOCUMENTS

| 837231 | 11/1938 | France | 280/257 |
| 874179 | 4/1942 | France | 280/256 |
| 323674 | 1/1935 | Italy | 280/253 |
| 378280 | 1/1940 | Italy | 280/253 |
| 160501 | 3/1921 | United Kingdom | 280/253 |

*Primary Examiner*—Mitchell J. Hill
*Attorney, Agent, or Firm*—Bruce L. Adams; Van C. Wilks

[57] ABSTRACT

There is provided an occupant-propelled land vehicle, such as a bicycle, having a frame, at least one front wheel, at least one rear wheel, and a seat for the rider of the vehicle, supported by the frame, wherein two levers, each having a front end and a back end, are pivoted on the frame on each side forwardly of the rear wheel and at a point substantially closer to the back end than to the front end. Two rigidly interconnected and spaced-apart parallel discs, one of the discs being toothed, are associated with an upper portion of the rear wheel. Connecting rods are pivotally connected to the back ends of the levers and are eccentrically-rotatably connected to the discs, a sprocket wheel is connected to the axle of rear wheel, and a driving chain is included in a connection between the toothed disc and the rear-wheel sprocket wheel. Downward pressure on the front end of a lever will cause the connecting rod at the back end of the lever to move upwardly to cause the associated disc and the rigidly-joined disc to rotate, which rotation is transmitted by the chain to the rear-wheel sprocket wheel and thereby to the rear wheel of the vehicle to cause movement of the vehicle over the land.

2 Claims, 1 Drawing Sheet

BICYCLE AND THE LIKE

FIELD OF THE INVENTION

This invention relates to a wheeled land vehicle of the occupant-propelled type and is more particularly concerned with a wheeled vehicle of the character indicated which has at least one front wheel, and especially relates to a bicycle suited to be propelled along the ground by the rider with a minimum of effort.

BACKGROUND OF THE INVENTION

Bicycles have, of course, been known and used for many years, and various methods for their propulsion have been proposed. The most common method is the almost universally seen system, which involves foot pedals connected to crank arms which drive a large sprocket wheel, the rotary motion of which is transmitted by an endless chain to a smaller sprocket wheel connected to the rear wheel of the bicycle.

Wilburn U.S. Pat. No. 608,241, however, shows a system using stirrups which are reciprocated vertically by the rider and are connected to drive a rack which meshes with the sprocket wheel or pinion connected to the rear wheel.

Price U.S. Pat. No. 384,543 proposes the use of levers or treadles pivoted at their forward ends and constructed to operate cranks which rotate pinions which mesh with second pinions connected to the front wheel of the bicycle.

Thorp U.S. Pat. No. 436,844 also uses treadle levers which are connected directly to aligned crank-wheels which, by a complicated system of meshing gears and friction wheels drive the rear wheel of the bicycle.

Booth et al U.S. Pat. No. 594,980 shows a system somewhat similar to that of Price, but the treadle or pedal levers replace pedals in the conventional type of drive and rotate the large front sprocket wheel which carries a chain which rotates the rear sprocket wheel and thus the rear wheel.

Greenison U.S. Pat. No. 1,427,589 uses levers or treadles which are pivoted to the bicycle frame and have elongated slots at their ends rearwardly of the back wheel. These slots receive crank arms connected to a sprocket wheel which in turn drives a second sprocket wheel connected to the rear wheel of the bicycle. The levers carry pedals at their forward ends.

McNeill U.S. Pat. No. 1,505,271 modified the Greenison patent by having the levers carried at the rear in slots in extensions of the bicycle frame and having the sprocket cranks provided with shafts passing through apertures in the levers.

In these prior constructions using levers or treadles, relatively complicated arrangements are shown involving cranks, wear-prone slots, or some other such construction which suffers from undue problems of friction and usually makes it necessary to apply substantial force, as in the conventional construction, in order for the rider to move the vehicle along the ground, particularly when starting up.

OBJECTS OF THE INVENTION

It is, accordingly, an object of the present invention to provide an occupant-propelled ground vehicle, such as a bicycle, or the like, which has foot-engaged levers or treadles but wherein power is transmitted to the rear wheel of the vehicle in a manner which avoids the drawbacks and disadvantages of prior constructions.

It is another object of the invention to provide a vehicle of the character indicated which requires a minimum of effort to propel it along the ground and can be so propelled easily by persons of limited strength.

It is a further object of the invention to provide a bicycle which can be ridden and rapidly propelled on level ground and on hills without gear changes.

It is still another object of the invention to provide a bicycle wherein foot power by the rider can be transmitted to the rear wheel with substantial augmentation while friction is held to a minimum.

SUMMARY OF THE INVENTION

In accordance with the invention, there is provided an occupant-propelled land vehicle having a frame, at least one front wheel, at least one rear wheel, and a seat for the rider of the vehicle, supported by the frame, wherein two levers, each having a front end and a back end, are pivoted on said frame on each side thereof forwardly of said rear wheel and at a point substantially closer to said back end than to said front end, two rigidly-axially-interconnected but spaced-apart parallel discs, means supporting said discs associated with an upper portion of said rear wheel, connecting rods pivotally connected to the back ends of said levers and eccentrically-pivotally connected to said discs, a sprocket wheel connected to the axle of the rear wheel, and means including a driving chain connecting a toothed disc to the rear-wheel sprocket wheel, whereby downward pressure on the front end of a lever will cause the connecting rod at the back end of the lever to move upwardly to cause the associated disc and the rigidly-joined disc to rotate, said rotation being transmitted by said chain means to the rear-wheel sprocket wheel and thereby to the rear wheel of the vehicle to cause movement of the vehicle over the land.

It is a feature of the invention that the levers are pivoted forwardly of the back wheel of the vehicle and that the levers operate without friction wheels and without the need for friction-causing slots or cranks engaged in said slots.

BRIEF DESCRIPTION OF THE DRAWINGS

Other objects and features of the invention will be readily apparent, and the invention will be more readily understood, from the following detailed description of illustrative embodiments thereof and from the accompanying drawings wherein.

DESCRIPTION OF THE PREFERRED EMBODIMENTS

Figure 1:
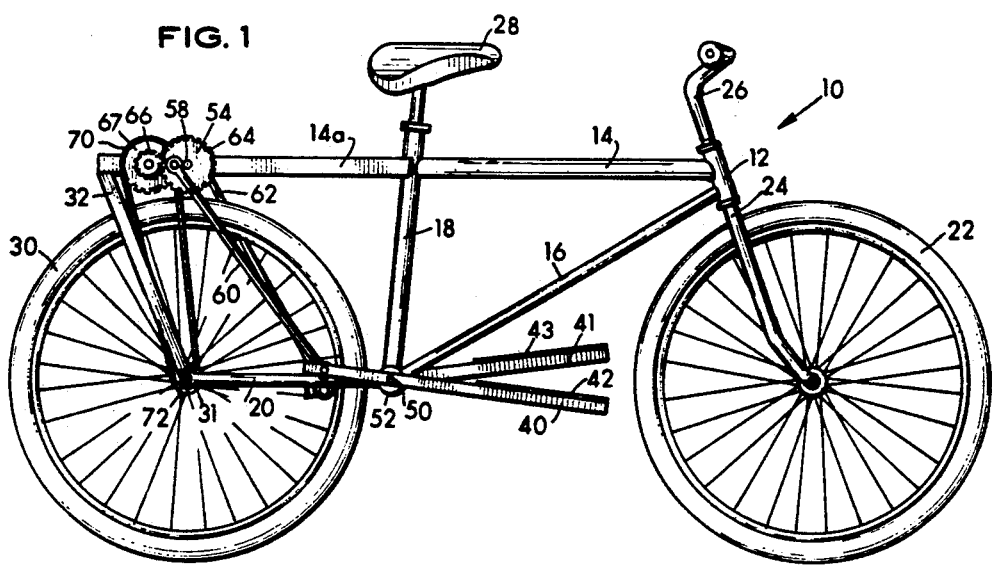
FIG. 1 is a side elevational view of a bicycle embodying features of the present invention.

Referring to the drawings, the invention is illustrated by means of a two-wheeled bicycle. In the embodiment shown, the bicycle is designated generally by the reference number 10. As seen particularly in FIG. 1, the bicycle 10 has a frame which includes a head tube 12, a top tube 14, a down tube 16, a seat tube 18, and stays 20 which extend rearwardly from the junction of the seat tube 18 and the down tube 16. The tubes 16, 18 and stays 20 join at a housing 52, much the way the down tube, the seat tube and the chain stays join at the crank hanger in a conventional bicycle construction. Unlike a conventional bicycle, however, the seat tube 18 is preferably inclined forwardly and the down tube 16 is longer than the top tube 14 and there is no crank hanger because there are no pedals or cranks. The housing 52 is generally cylindrical and has an anxial bore.

A front wheel 22 of conventional form is journalled in the front fork 24 and a handle bar 26 for manual steering is of the usual construction. A seat, e.g. a saddle 28, is mounted atop the seat tube 18, and a rear wheel 30, also suitably of conventional form, is journalled in rear stay end 31 A bar 14a extends from seat tube 18, more or less at the level of top tube 14 and defining, in essence, an extension of top tube 14, although it could be at a lower or higher level if desired. Bar 14a extends over rear wheel 30. The rearward end of bar 14a is connected and braced on each side of rear wheel 30 to stays 20 by rear braces 32, the junction being created by rear stay ends 31, which are of conventional construction, and in which rear wheel 30 is journalled in the usual manner.

Figure 2:
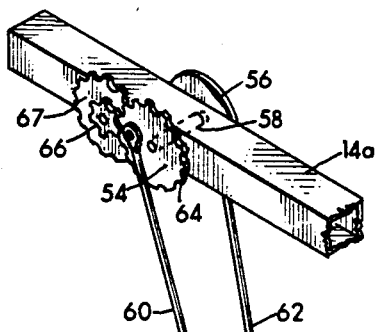
FIG. 2 is a perspective view of the levers, the connecting rods and the discs of the bicycle of FIG. 1, on an enlarged scale.

Propulsion of the bicycle 10 is effected by downward pressure of the rider's feet on the front ends of levers 40 and 41. Levers 40 and 41 are rotatably mounted on a fulcrum pin or rod 50 which extends through the housing 52 at the junction of the down tube 16, the seat tube 18, and the rear stays 20. The fulcrum pin 50 extends through the axial bore of the housing 52 from one side of the bicycle to the other, and is firmly secured in the bore. The free ends of fulcrum pin 50 are suitably threaded, and the levers 40 and 41 are secured, but free to pivot on fulcrum pin 50, by nuts 51, as seen in FIG. 2. Thus, fulcrum pin or rod is, in effect, a pivot pin or pivot rod. Levers 40 and 41 are suitably provided with treads 42 and 43, respectively, for secure engagement by the feet of the rider.

As also seen more clearly in FIG. 2, the rearwardly-extending bar 14a carries discs 54 and 56 which are connected to each other by means of a shaft 58 which is rotatably journalled in bar 14a. The back end of lever 40 carries a connecting rod 60 which is pivotally connected to lever 40 at one end and is rotatably connected to disc 54 at the other. In like manner, a connecting rod 62 is pivotally connected to the back end of lever 41 and rotatably connected to disc 56. Discs 54 and 56 are rigidly interconnected.

In the embodiment illustrated, disc 54 is provided with teeth 64 on its periphery, and these teeth 64 mesh with the teeth of a smaller gear wheel 66 which is integrally united with, but spaced axially from, a gear wheel 67 of greater diameter than gear wheel 66. A chain 70 engages the teeth of gear wheel 67 as well as the teeth of rear sprocket wheel 72 so that rotation of gear wheel 67 will cause rotation of rear sprocket wheel 72 and thus of the rear wheel 30 of the bicycle.

Figure 3:
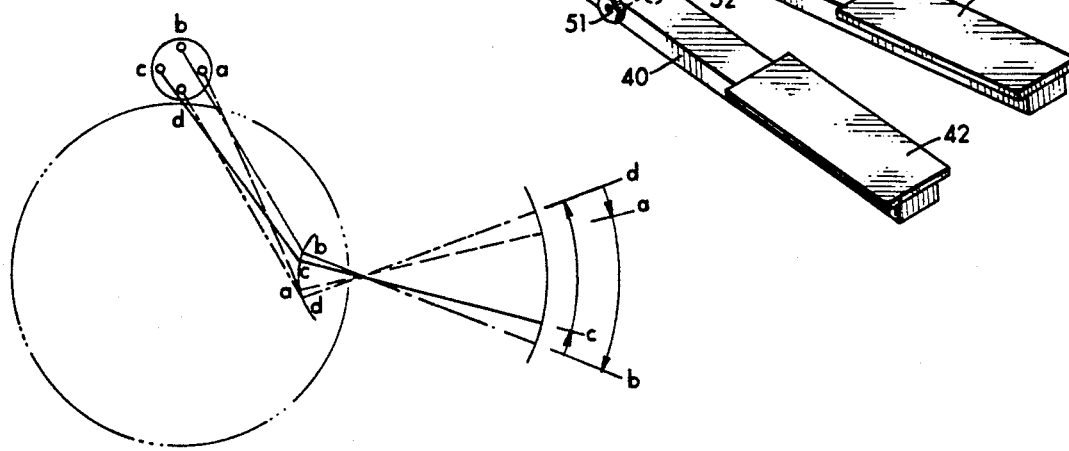
FIG. 3 is a diagrammatic view illustrating how the movements of the levers relate to the rotation of the discs.

As will be apparent, expecially from FIG. 3, when the forward ends of levers 40 and 41 are alternately depressed by the feet of the rider, the connecting rods 60 and 62 will be alternately moved upwardly and will rotate the discs 54 and 56. The connections of the connecting rods 60 and 62 to the discs 54 and 56, respectively, are offset by 180° so that the connecting rods 60 and 62 will uniformly rotate the discs 54 and 56 as the levers 40 and 41 are alternately depressed at their forward ends by the feet of the rider. As seen in FIG. 3, when a lever is in the position of the line a-a, the upper end of the associated connecting rod is at position a; when a lever is in the position of the line b-b, the upper end of the associated connecting rod is at position b, etc.

Because the fulcrum pin 50 engages the levers 40 and 41 at a point much closer to the back ends of the levers than to their front ends, a relatively light force applied to the front ends of levers 40 and 41 will cause a substantially greater propelling force. Preferably, the distance from the fulcrum pin 50 to the forward ends of the levers 40 and 41 is at least three times the distance from the fulcrum pin 50 or pivot point to the point of articulation of the connecting rods 60 and 62.

It will be understood that the dimensions of the frame of the bicycle 10 are selected so that the rider, seated upon the saddle 28, can conveniently reach and apply force to the forward ends of levers 40 and 41. Because it is a feature of the invention that the fulcrum is forwardly of the rear wheel 30, the rear wheel 30 will normally be further apart from the front wheel 22 but the overall length of the bicycle 10 can be kept within the limits prescribed for bicycles, e.g. by racing organizations. For this purpose, it is desirable to position the housing 52 as close to the forward end of rear wheel 30 as possible.

It will also be understood that various changes and modifications may be made without departing from the invention as defined in the appended claims. For example, the invention may be applied to and readily embodied in a tricycle. Accordingly, it is intended that all matter contained in the foregoing description and in the drawings shall be interpreted as illustrative only and not in a limiting sense.

We claim:

1. A bicycle comprising a frame, a front wheel, a rear wheel, and a seat for the rider of the bicycle, supported by the frame, and further comprising two levers, each having a front wheel and a back end, pivoted on said frame on each side thereof forwardly of said rear wheel to provide a pivot point substantially closer to said back end than to said front end, two rigidly-axially-interconnected but spaced-apart parallel discs, one of which disc is a toothed discs, associated with an upper portion of said rear wheel, a rotatable shaft to which said discs are radially connected, supporting means for said shaft, connecting rods pivotally connected to the back ends of said levers and eccentrically-rotatably connected to said discs, a sprocket wheel connected to the axle of said rear wheel, and means including a driving chain connecting said toothed disc to the rear-wheel sprocket wheel, whereby downward pressure on the front end of a lever will cause the connecting rod at the back end of the lever to move upwardly to cause the disc to which said lever is rotatably connected and the rigidly axially-interconnected disc to rotate, said rotation being transmitted by said chain means to the rear-wheel sprocket wheel and thereby to the rear wheel of the bicycle to cause movement of the bicycle over the land, said supporting means being a rearwardly-extending bar, said bar forming a rearwardly-extending portion of said frame, said front ends of said levers being at least three times further from said pivot point than are said back ends, and said connecting means including a smaller gear wheel meshing with said toothed disc and a larger second gear wheel driven by said smaller gear wheel carrying said driving chain, said smaller and said larger gear wheels being axially spaced.

2. A vehicle as defined in claim 1, further including a cylindrical housing, and wherein said frame includes a seat tube and a down tube which form a junction at said cylindrical housing, and a pivot rod is supported axially in said housing to provide the pivot for each lever.

* * * * *